(12) United States Patent
Zheng et al.

(10) Patent No.: US 12,135,451 B1
(45) Date of Patent: Nov. 5, 2024

(54) BACKLIGHT MODULE AND DISPLAY DEVICE

(71) Applicant: HKC CORPORATION LIMITED, Shenzhen (CN)

(72) Inventors: Jinrong Zheng, Shenzhen (CN); Haijiang Yuan, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/530,150

(22) Filed: Dec. 5, 2023

(30) Foreign Application Priority Data

Apr. 24, 2023 (CN) .......................... 202310448371.5

(51) Int. Cl.
  *F21V 8/00* (2006.01)

(52) U.S. Cl.
  CPC ......... *G02B 6/0066* (2013.01); *G02B 6/0076* (2013.01)

(58) Field of Classification Search
  CPC .......................... G02B 6/0066; G02B 6/0076
  See application file for complete search history.

(56) References Cited

U.S. PATENT DOCUMENTS

2004/0239611 A1    12/2004   Huang

FOREIGN PATENT DOCUMENTS

| CN | 105589239 A | 5/2016 |
|---|---|---|
| CN | 106054453 A | 10/2016 |
| CN | 211192555 U | 8/2020 |
| CN | 213900893 U | 8/2021 |
| CN | 116203763 A | 6/2023 |
| JP | 2005050630 A | 2/2005 |
| JP | 3221232 U | 5/2019 |

OTHER PUBLICATIONS

Notice of Allowance and Fee Due issued Oct. 23, 2023, on a CN Application No. CN202310448371.5. English abstract attached.
Office Action issued Jun. 7, 2023, on a CN Application No. CN202310448371.5. English abstract attached.
Rejection Decision issued Jun. 22, 2023, on a CN Appliaction No. CN202310448371.5. English abstract attached.
Reexamination Decision issued Oct. 8, 2023, on a CN Application No. CN202310448371.5. English abstract attached.
Allowable Claims in OEE CN Application No. CN202310448371.5.

*Primary Examiner* — Donald L Raleigh
(74) *Attorney, Agent, or Firm* — Franklin & Associates International Inc; Matthew F. Lambrinos

(57) ABSTRACT

Disclosed is a backlight module and a display device. The backlight module includes a light guide plate assembly including: a first light guide plate and a second light guide plate disposed back to back in a first direction; an adjustment member disposed on a side of the light guide plate assembly in a second direction; a light emitter connected to the adjustment member; and a light intensifier connected to the adjustment member and disposed between the light emitter and the light guide plate assembly in the second direction. The backlight module and the display device can have a good display effect, reduce space occupancy, and save costs while switching between single-sided display and double-sided display.

8 Claims, 2 Drawing Sheets

BACKLIGHT MODULE AND DISPLAY DEVICE

CROSS-REFERENCE TO RELATED APPLICATIONS

This application claims all the benefits of the Chinese patent application No. 202310448371.5 filed on Apr. 24, 2023 before the China National Intellectual Property Administration of the People's Republic of China, entitled "Backlight Module and Display Device", which is incorporated herein by reference in its entirety.

FIELD

The present disclosure relates to the technical field of display, in particular to a backlight module and a display device.

BACKGROUND

A liquid crystal display device mainly includes a liquid crystal display (abbreviated as LCD) panel and a backlight module mainly including a backplate, a light guide plate and a LED light bar. In many large public places, a variety of displays are placed, and every two displays are generally set back to back, which has high space occupancy and high costs. In some places, in order to reduce costs, a double-sided liquid crystal display is used, whose two liquid crystal display screens can display images synchronously or asynchronously. However, the double-sided liquid crystal display can display images on both sides or no side, and when there is only need of single-sided display, since only single-sided display is impossible, a waste of energy is caused, and costs are increased.

SUMMARY

In an aspect, an embodiment of the present disclosure provides a backlight module, comprising:
- a light guide plate assembly comprising a first light guide plate and a second light guide plate disposed back to back in a first direction;
- an adjustment member disposed on a side of the light guide plate assembly in a second direction intersecting with the first direction;
- a light emitter connected to the adjustment member; and
- a light intensifier connected to the adjustment member and disposed between the light emitter and the light guide plate assembly in the second direction, wherein the adjustment member can drive the light emitter and the light intensifier to move along the first direction, so that the light emitter is opposite the light intensifier in the second direction, and light emitted by the light emitter passes through the light intensifier and enters the first light guide plate and the second light guide plate respectively, or, the light emitter and the light intensifier are far away from each other, and light emitted by the light emitter directly enters one of the first light guide plate and the second light guide plate.

In some embodiments, the first light guide plate has a first light entry surface and a first light exit surface, the second light guide plate has a second light entry surface and a second light exit surface, and the first light exit surface and the second light exit surface are disposed back to back on the first light guide plate and the second light guide plate along the first direction; the first light entry surface and the second light exit surface are disposed on a same side of the light guide plate along the second direction, and the first light entry surface and the second light exit surface are disposed in a same plane.

In some embodiments, the adjustment member drives the light emitter and the light intensifier to move simultaneously in reverse directions in the first direction.

In some embodiments, the adjustment member comprises:
- a drive motor; and
- a screw assembly comprising a first screw and a second screw parallel to each other, and an axis direction of the first screw is parallel to the first direction, the drive motor connects the first screw and the second screw, the first screw is threadedly connected to the light intensifier, and the second screw is threadedly connected to the light emitter, the drive motor can drive the first screw and the second screw to rotate in reverse directions, so as to drive the light emitter and the light intensifier to move in the reverse directions.

In some embodiments, the adjustment member further comprises a third screw and gear sets, an axis direction of the third screw is parallel to the second direction, the gear sets are disposed at both ends of the third screw respectively, the gear sets connect the first screw, the second screw, and the third screw, and the drive motor is connected to either of the first screw and the second screw.

In some embodiments, when the drive motor is connected to the second screw, a force output by the drive motor can drive the second screw to rotate in a forward direction, the direction is reversed by the third screw and the gear sets at both ends, and meanwhile, the first screw rotates in a reverse direction under the action of the gear sets, so that the light emitter and the light intensifier maintain simultaneous and reverse movement all the time.

In some embodiments, a length of the light intensifier along a third direction is equal to a length of the light guide plate, the first direction, the second direction, and the third direction intersect with each other, and the first screw does not interfere with the light intensifier.

In some embodiments, the first direction, the second direction, and the third direction are perpendicular to each other.

In some embodiments, the first light guide plate and the second light guide plate have the same thickness in the first direction, and a width of the light intensifier in the first direction is not greater than the thickness of the first light guide plate.

In some embodiments, the backlight module comprises at least a first working state, a second working state, and a third working state, and the adjustment member can drive the light intensifier and the light emitter to move to switch between the first working state, the second working state, and the third working state, wherein,
- in the first working state, the light emitter is opposite a connection between the first light guide plate and the second light guide plate, and an orthographic projection of the light source of the light emitter in the second direction is at a center of the light intensifier;
- in the second working state, the orthographic projection of the light source of the light emitter in the second direction is at a center of the first light guide plate, and an orthographic projection of the light intensifier in the second direction is at the second light guide plate; and
- in the third working state, the orthographic projection of the light source of the light emitter in the second direction is at a center of the second light guide plate, and the orthographic projection of the light intensifier in the second direction is at the first light guide plate.

In some embodiments, the light emitter comprises a plurality of light sources spaced apart in the third direction, and the first direction, the second direction, and the third direction intersect with each other.

In some embodiments, the backlight module further comprises a lens enclosing the light source.

In some embodiments, the backlight module further comprises a reflective layer between the first light guide plate and the second light guide plate, wherein the reflective layer is coated on at least one of the first light guide plate and the second light guide plate, and the coated reflective layer fixedly connects the first light guide plate and the second light guide plate.

In some embodiments, the reflective layer is a reflector adhering to a surface of the light guide plate or a reflective coating formed directly on the surface of the light guide plate, the reflector or the reflective coating is made of a plastic material, and the reflector further comprises a highly reflective coating coated onto the plastic material.

In another aspect, an embodiment of the present disclosure provides a display device, comprising:

two liquid crystal display panels; and
a backlight module comprising:
a light guide plate assembly comprising a first light guide plate and a second light guide plate disposed back to back in a first direction;
an adjustment member disposed on a side of the light guide plate assembly in a second direction intersecting with the first direction;
a light emitter connected to the adjustment member; and
a light intensifier connected to the adjustment member and disposed between the light emitter and the light guide plate assembly in the second direction, wherein
the adjustment member can drive the light emitter and the light intensifier to move along the first direction, so that the light emitter is opposite the light intensifier in the second direction, and light emitted by the light emitter passes through the light intensifier and enters the first light guide plate and the second light guide plate respectively, or, the light emitter and the light intensifier are far away from each other, and light emitted by the light emitter directly enters one of the first light guide plate and the second light guide plate;
wherein the backlight module is disposed between the two liquid crystal display panels to provide backlight for the two liquid crystal display panels.

According to the backlight module and the display device provided by embodiments of the present disclosure, the backlight module is a side-entry backlight module comprising a first light guide plate and a second light guide plate disposed back to back, a movable light intensifier and a movable light emitter are disposed on a side of the light entry surfaces of the light guide plates, and the adjustment member can drive the light emitter and the light intensifier to move to a position where the light emitted by the light emitter can only be emitted into one of the light guide plates as needed to provide backlight, realizing single-sided display. The adjustment member can also make the light emitter opposite the light intensifier, so that the emitted light can be emitted into the first light guide plate and the second light guide plate simultaneously to provide backlight for both at the same time, realizing double-sided display. The display device can realize switch between the single-sided display and the double-sided display as needed and ensure stable display brightness and a good display effect in different display states while reducing space occupancy and saving costs.

BRIEF DESCRIPTION OF DRAWINGS

Features, advantages, and technical effects of exemplary embodiments of the present disclosure will be described below with reference to the accompanying drawings. In the drawings, identical components bear the same reference numerals. The drawings are not drawn to actual scale and are used merely to illustrate relative positional relationships. Some parts are drawn exaggeratedly in layer thicknesses to facilitate understanding, and the layer thicknesses in the drawings do not represent actual layer thicknesses.

Figure 1:
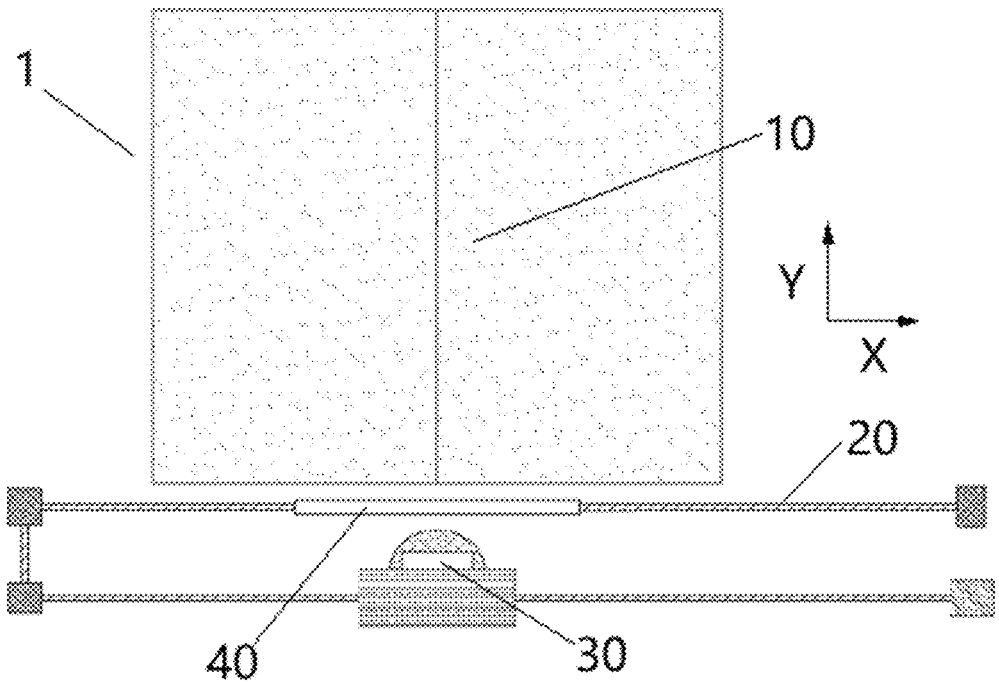
FIG. 1 illustrates a simple structural schematic diagram of a backlight module provided in an embodiment of the present disclosure in a first working state, wherein a direction indicated by an arrow X is a first direction, and a direction indicated by an arrow Y is a second direction.

DESCRIPTION OF REFERENCE NUMERALS 1. backlight module; 10. light guide plate assembly; 101. first light guide plate; 102. second light guide plate; 103. reflective layer; 20. adjustment member; 201. drive motor; 202. first screw; 203. second screw; 204. slider; 205. gear set; 206. third screw; 30. light emitter; 301. light source; 302. lens; 40. light intensifier; 401. light intensifying film; 2. liquid crystal display panel; 3. display device.

DETAILED DESCRIPTION

Features and exemplary embodiments of various aspects of the present disclosure will be described in detail below. In the following detailed description, numerous specific details are set forth in order to provide a thorough understanding of the present disclosure. However, it will be apparent to a person skilled in the art that the present disclosure may be implemented without some of these specific details. The following description of embodiments is merely to provide a better understanding of the present disclosure by illustrating examples of the present disclosure. In the drawings and the description below, at least some of the well-known structures and technologies are not shown in order to avoid unnecessarily obscuring the present disclosure; and for clarity, the dimensions of an area structure may be exaggerated. Furthermore, the features, structures, or characteristics described below may be combined in any suitable manner in one or more embodiments.

Specific structures of a backlight module and a display device including the backlight module provided in embodiments of the present disclosure are described separately below in combination with the drawings.

Figure 2:
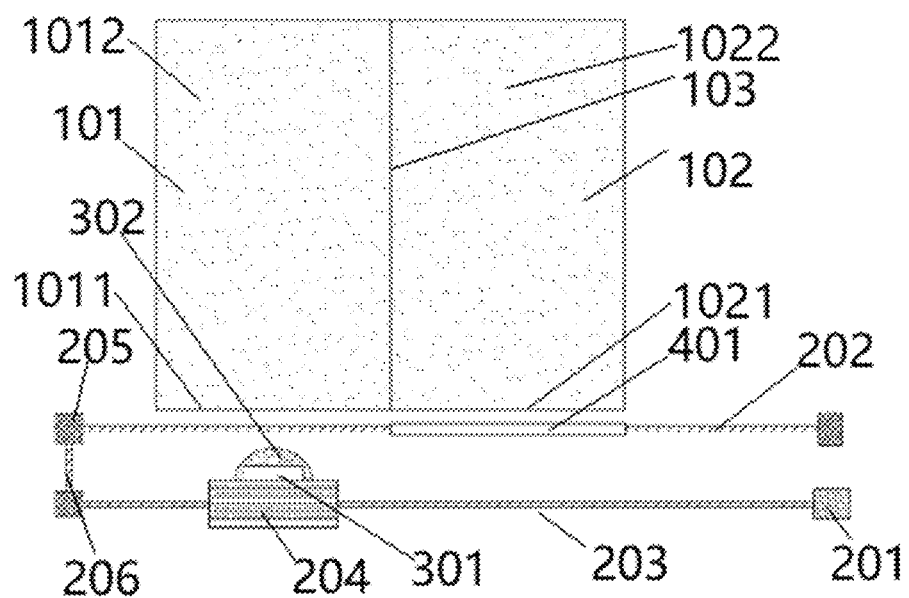
FIG. 2 illustrates a simple structural schematic diagram of a backlight module provided in an embodiment of the present disclosure in a second working state.

FIG. 1 illustrates a simple structural schematic diagram of a backlight module provided in an embodiment of the present disclosure in a first working state. FIG. 2 illustrates a simple structural schematic diagram of a backlight module provided in an embodiment of the present disclosure in a second working state. Wherein, a direction indicated by an arrow X is a first direction, a direction indicated by an arrow Y is a second direction, and a direction perpendicular to a paper surface is a third direction as seen from FIG. 1. The first direction X, the second direction Y and the third direction intersect with each other. In some embodiments, the first direction X, the second direction Y and the third direction are perpendicular to each other.

As shown in FIG. 1 and FIG. 2, an embodiment of the present disclosure provides a backlight module 1 disposed between two liquid crystal display panels to provide backlight for the two liquid crystal display panels. The backlight module 1 is a side-entry backlight module. The backlight module 1 includes a light guide plate assembly 10 including a first light guide plate 101 and a second light guide plate 102 connected in the first direction X and disposed back to back.

The first light guide plate 101 has a first light entry surface 1011 and a first light exit surface 1012, the second light guide plate 102 has a second light entry surface 1021 and a second light exit surface 1022, and the first light exit surface 1012 and the second light exit surface 1022 are disposed back to back on the first light guide plate 101 and the second light guide plate 102 along the first direction X. The first light entry surface 1011 and the second light exit surface 1021 are disposed on the same side of the light guide plate along the second direction Y, and the first light entry surface 1011 and the second light exit surface 1021 are in the same plane.

In some embodiments, the two light guide plates may be made of polymethylmethacrylate (PMMA), polycarbonate (PC), polyethylene (PE), light guide artificial resin, or the like, which has a high light transmittance. Light can enter the first light guide plate 101 from the first light entry surface 1011, and then be ejected from one side of the first light exit surface 1012 into an opposite liquid crystal display panel, thereby converting a point light source or a line light source into a surface light source, so that the entire surface of the liquid crystal display panel is illuminated with a substantially uniform and consistent brightness. Similarly, a principle of the second light guide plate 102 is the same and will not be repeated here.

It can be understood that the first light exit surface 1012 and the second light exit surface 1022 are a larger surface of the light guide plate, the first light entry surface 1011 and the second light entry surface 1021 are a smaller surface of the light guide plate, and the larger surfaces are opposite the liquid crystal display panels, respectively. In addition, a shape and size of the larger surface of the light guide plate can match a shape and size of the provided liquid crystal display panel. For example, when the shape of the liquid crystal display panel is rectangular, the shapes of the first light guide plate 101 and the second light guide plate 102 are also rectangular.

In some embodiments, the backlight module 1 further includes a reflective layer 103 which may include a first reflective layer and a second reflective layer, and the first reflective layer is provided on the first light guide plate 101, the second reflective layer is provided on the second light guide plate 102. The first reflective layer and the second reflective layer are provided opposite to each other, and reflection directions of the first reflective layer and the second reflective layer are opposite, so as to form the first light guide plate 101 and the second light guide plate 102 back to back. Alternatively, the reflective layer 103 may be a double-sided reflective layer having one layer, and it can be understood that the shape and size of the reflective layer 103 match those of the larger surface of the light guide plate, which will not be described in detail here.

The reflective layer 103 may be, for example, a reflector adhering to the surface of the light guide plate or a reflective coating formed directly onto the surface of the light guide plate. The reflector may be made of a plastic material, and the reflective coating may be the same material. For example, polyethylene terephthalate (PET), polycarbonate (PC), or polystyrene (PS). The reflector may also include a highly reflective coating, e.g., titanium dioxide (TiO$_2$), coated onto the plastic material to increase a light reflection coefficient.

In the embodiment of the present disclosure, regarding the first light guide plate 101 and the second light guide plate 102 disposed back to back, a side of the light guide plate away from the light exit surface needs to be pre-set with grid dots, and it is necessary to ensure that the two light guide plates are disposed in reverse directions during assembly, or there easily arises a risk of mis-installation. In order to improve assembly efficiency and to reduce an error rate, the light guide plate assembly 10 can be produced by the following processing method:

first, melting a material of the light guide plate and then fabricating the first light guide plate 101 and the second light guide plate 102 by injection molding separately, and punching grid dots on the larger surface sides of the two light guide plates separately; and next, coating a reflective material on a surface of the side with grid dots, and fixedly connecting the first light guide plate 101 and the second light guide plate 102 after curing by heating.

It should be understood that the reflective material can be coated on the surface of either or both of the light guide plates, and after curing by heating, the cured reflective material is used to fixedly connect the first light guide plate 101 and the second light guide plate 102, and the reflective material forms the reflective layer 103 after being cured. This form of fixedly connecting the two in advance reduces the risk of mis-installation, has higher stability, and improve a reflective effect.

It can be understood that a thickness of the reflective layer 103 between the first light guide plate 101 and the second light guide plate 102 can be adaptively adjusted according to actual needs and is not specifically limited here.

For example, shapes of the first light guide plate 101 and the second light guide plate 102 are set to rectangular, and the light guide plates 101 and 102 are connected back to back to form an integrated structure as described above, thereby describing the backlight module 1 of the embodiment of the present disclosure in detail below, which will not be separately emphasized thereafter.

The backlight module 1 further includes a light intensifier 40 and a light emitter 30 disposed toward the first light entry surface 1011 and the second light entry surface 1021, i.e., the light intensifier 40 and the light emitter 30 are disposed apart on a side of the light guide plate assembly 10 toward the two light entry surfaces, and the light intensifier 40 is disposed between the light emitter 30 and the light guide plate assembly 10 in the second direction Y, and an adjustment member 20 connects the light emitter 30 and the light intensifier 40 respectively, so as to drive the light intensifier 40 and the light emitter 30 along the first direction X. When the two are driven to move until the light emitter 30 and the light intensifier 40 are opposite each other in the second direction Y, light emitted by the light emitter 30 passes through the light intensifier 40 and enters the first light guide plate 101 and the second light guide plate 102 from the first light entry surface 1011 and the second light entry surface 1021 respectively, so as to provide backlight for the two liquid crystal display panels to realize double-sided display. When the light emitter 30 and the light intensifier 40 are driven away from each other, the light emitter 30 is moved to a position of the corresponding light guide plate, so that the light emitted by the light emitter 30 is only emitted into the first light entry surface 1011 or the second light entry surface 1021, so as to provide backlight for the liquid crystal display panel corresponding to either of the light guide plates to realize single-sided display. Relative movement between the light intensifier 40 and the light emitter 30 is adjusted by the adjustment member 20 to realize switch between the single-sided display and the double-sided display, which can ensure stability and uniformity of brightness of the single-sided display and the double-sided display and avoid the problem of dark brightness during the double-sided display without increasing luminous intensity of the light source during the double-sided display, has a good display effect, and saves energy. Moreover, such structure reduces space occupancy and saves costs.

In some embodiments, the light emitter 30 may be a light-emitting diode (LED) which can be used as a self-luminous light source display, and has advantages of low power consumption, high brightness, high resolution, high color saturation, fast response speed, long lifetime, high efficiency, and the like.

In some embodiments, the adjustment member 20 drives the light emitter 30 and the light intensifier 40 to move simultaneously in reverse directions in the first direction X. The adjustment member 20 drives the light emitter 30 and the light intensifier 40 to move simultaneously in the reverse directions, so as to facilitate switch between the single-sided display and the double-sided display by adjusting a relative positional relationship between the light emitter 30 and the light intensifier 40. The switching process has high stability, and enables the light emitter 30 and the light intensifier 40 to be conveniently and quickly adjusted to the opposite positions, so as to improve a utilization rate of light.

In some embodiments, the adjustment member 20 includes a drive motor 201 and a screw assembly, the screw assembly includes a first screw 202 and a second screw 203 parallel to each other, and an axis direction of the first screw 202 is parallel to the first direction X. The drive motor 201 connects the first screw 202 and the second screw 203, the first screw 202 is threadedly connected to the light intensifier 40, and the second screw 203 is threadedly connected to the light emitter 30, the drive motor 201 can drive the first screw 202 and the second screw 203 to rotate in the reverse directions, so as to drive the light emitter 30 and the light intensifier 40 to move in the reverse directions.

In some embodiments, the drive motor 201 may be, for example, a servomotor, which may be set to two, and output shafts of the two servomotors are connected to the first screw 202 and the second screw 203 respectively to drive the servomotors to rotate in the reverse directions at the same time, so as to realize reverse rotation of the first screw 202 and the second screw 203, thereby driving the connected light emitter 30 and light intensifier 40 to move in the reverse directions in the first direction X simultaneously.

In some embodiments, only one servomotor is provided, and the adjustment member 20 further includes a third screw 206 and gear sets 205, an axis direction of the third screw 206 is parallel to the second direction Y, the gear sets 205 are disposed at both ends of the third screw 206 respectively, the gear set 205 connects the first screw 202, the second screw 203, and the third screw 206, and the drive motor 201 is connected to either of the first screw 202 and the second screw 203.

It can be understood that the gear set 205 includes a first gear and a second gear meshed together, the first gear and the second gear connect the first screw 202 to the third screw 206 and the third screw 206 to the second screw 203 respectively, so as to combine the first screw 202, the second screw 203, and the third screw 206 via the gear set 205 to form a drive medium. For example, when the drive motor 201 is connected to the second screw 203, a force output by the drive motor 201 can drive the second screw 203 to rotate in a forward direction, the direction is reversed by the third screw and the gear sets at both ends, and meanwhile, the first screw 202 rotates in the reverse direction under the action of the gear set 205, so that the light emitter 30 and the light intensifier 40 maintain simultaneous and reverse movement all the time. This structure has high coordination stability, can accurately control the relative positional relationship between the light emitter 30 and the light intensifier 40, and can conveniently adjust the light emitter 30 and the light intensifier 40 to corresponding positions at the time of switch between the single-sided display and the double-sided display, thereby improving precision of the movement, and ensuring the display effects in the single-sided and double-sided display.

In some embodiments, the second screw is threadedly fitted with a slider 204, and the light emitter 30 can be fixedly connected to the corresponding slider 204. Moreover, in order to ensure that the light intensifier 40 achieves a good light transmission effect, a length of the light intensifier 40 along the third direction is equal to a length of the light guide plate, and the first screw 202 does not interfere with the light intensifier 40.

It can be understood that the adjustment member 20 may also be set as other structures capable of realizing simultaneous and reverse movement of the light intensifier 40 and the light emitter 30, which is not specifically limited here.

Figure 3:
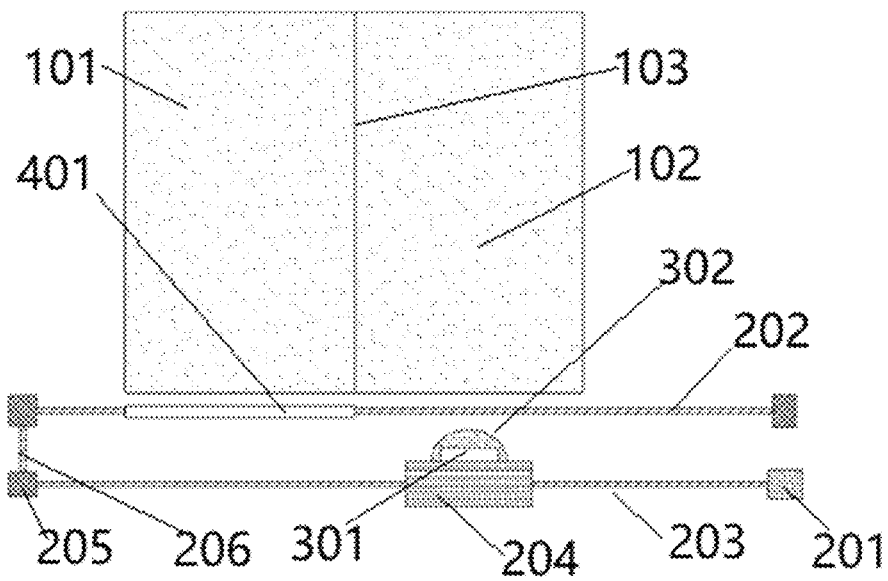
FIG. 3 illustrates a simple structural schematic diagram of a backlight module provided in an embodiment of the present disclosure in a third working state.

In some embodiments, as shown in FIG. 1 to FIG. 3, the first light guide plate 101 and the second light guide plate 102 have the same thickness in the first direction X, and a width of the light intensifier 40 in the first direction X is not greater than the thickness of the first light guide plate 101, so as to avoid a problem of uneven brightness since a part of light emitted by the light emitter 30 is emitted directly, and the other part of the light is emitted into the same light guide plate after being intensified by the light intensifier 40 during the single-sided display, and ensure that the light intensifier 40 is only used in the double-sided display and does not interfere with the light emitter 30 in the single-sided display.

In some embodiments, the backlight module 1 at least includes a first working state, a second working state, and a third working state, and the adjustment member 20 can drive the light intensifier 40 and the light emitter 30 to move to switch between the first working state, the second working state, and the third working state. It can be understood that the display device can realize double-sided display in the first working state, and the display device can realize single-sided display in the second working state and the third working state.

In the first working state, the light emitter 30 is opposite a connection between the first light guide plate 101 and the second light guide plate 102, and an orthographic projection of the light source of the light emitter 30 in the second direction Y is at the center of the light intensifier 40. In the first working state, the light emitter 30 is located between the first light guide plate 101 and the second light guide plate 102 along the second direction Y and is symmetrically disposed with respect to the light guide plate assembly 10, and the center of the light intensifier 40 is aligned with the center of symmetry of the light guide plate assembly 10. The position of the light emitter 30 and the light intensifier 40 in the first working state is set as an initial position, at which the light emitted by the light emitter 30 is uniformly divided into two parts after being intensified by the light intensifier 40 to be emitted into the first light entry surface 1011 and the second light entry surface 1021 respectively, thereby realizing the double-sided display, which ensures that brightness of the double-sided display is the same and more uniform and the brightness of the double-sided display is not lower than that of the single-sided display without changing the intensity of the light source, so as to save energy and reduce costs.

In the second working state, the orthographic projection of the light source of the light emitter 30 in the second direction Y is at the center of the first light guide plate 101, and the orthographic projection of the light intensifier 40 in the second direction Y is at the second light guide plate 102. In the third working state, the orthographic projection of the light source of the light emitter 30 in the second direction Y is at the center of the second light guide plate 102, and the orthographic projection of the light intensifier 40 in the second direction Y is at the first light guide plate 101. In the single-sided display, by disposing the light source of the light emitter 30 at a position corresponding to the center of the light guide plate, the center of the light intensifier 40 is exactly opposite to the center of the other light guide plate, so that the light source of the light emitter 30 does not interfere with the light intensifier 40, and luminance stability and uniformity of the single-sided display are ensured.

In the embodiment of the present disclosure, the adjustment member 20 can drive the light emitter 30 and the light intensifier 40 to move to switch between the first working state, the second working state, and the third working state, which improves movement stability and positioning accuracy of the light emitter 30 and the light intensifier 40, and can ensure a good display effect while switching between the single-sided display and the double-sided display conveniently and fast.

In some embodiments, the light emitter 30 includes a plurality of light sources 301 spaced apart in the third direction to form a light bar. A plurality of the light sources 301 are arranged at equal intervals along the third direction to ensure dispersed and uniform incidence to the corresponding light entry surface.

In some embodiments, a plurality of the light sources 301 are enclosed with a lens 302 to increase a diffusion angle of light to enable light to dispersedly enter the corresponding one or two light guide plates. It can be understood that when the double-sided display is needed, it is necessary to ensure that the light passing through the lens 302 can all enter the light intensifier 40, be intensified by the light intensifier 40, and then enter the first light guide plate 101 and the second light guide plate 102 in two even parts, which is not specifically limited herein.

In some embodiments, the light intensifier 40 may be, for example, a light intensifying film 401, and the light intensifying film 401 may be a structure composed of a prismatic bar and a substrate in the related art or may be designed as other structures with a light intensifying effect, which is not specifically limited herein. The fact that the light emitted by the light emitter 30 passes through the light intensifying film 401 can intensify the light and increase brightness of the light, so that brightness of light entering the first light guide plate 101 and the second light guide plate 102 respectively is higher and more uniform, and there will be no problem of dimming display brightness caused by the double-sided display, so as to ensure that the switch between the single-sided display and the double-sided display has a good effect.

In some embodiments, the backlight module may further include an optical assembly disposed on a side of the light exit surface of the two light guide plates. The optical assembly may include a diffusion plate and an optical film disposed on a side of the diffusion plate away from the light guide plate, and the diffusion plate is used to diffuse the light emitted by the light source to equalize the brightness of the entire backlight module. The optical film may include, for example, a prism sheet, a protection sheet, and the like, and the prism sheet is used to control a propagation direction of the light diffused by the diffusion plate, so that the propagation direction of the light is perpendicular to the liquid crystal display panel. The protection sheet is used to protect a prism of the prism sheet from scratches and the like. The protection sheet can also be used to widen a viewing angle that was previously narrowed due to the prism sheet. The diffusion plate is fixedly connected to the optical film by a transparent optical adhesive to prevent relative displacement between the diffusion plate and the optical film from affecting a light exit effect of the backlight module.

Figure 4:
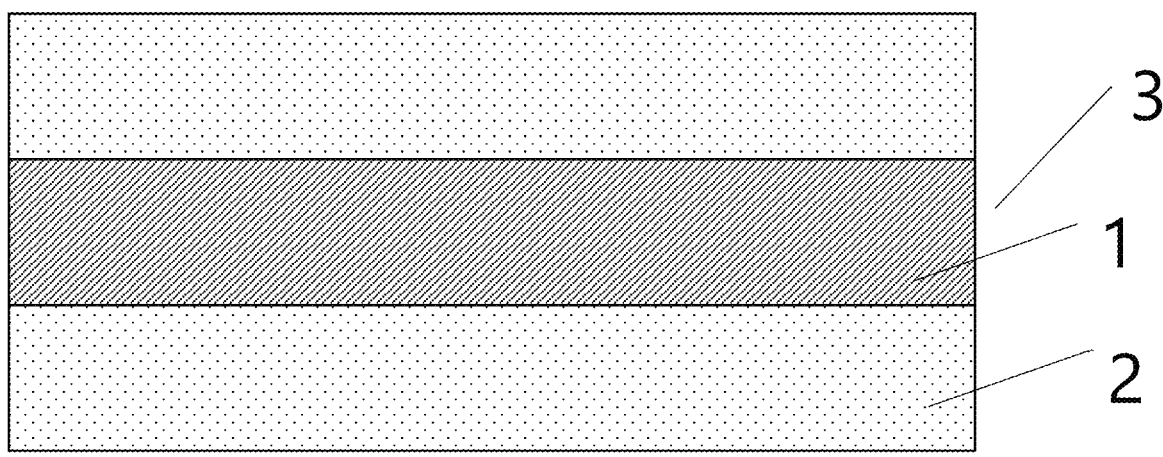
FIG. 4 illustrates a schematic diagram of a display device provided in an embodiment of the present disclosure.

In addition, as shown in FIG. 4, an embodiment of the present disclosure further provides a display device 3 including the above-described backlight module 1 and two liquid crystal display panels, wherein the backlight module 1 is disposed between the two liquid crystal display panels 2 to provide backlight for the two liquid crystal display panels 2.

Each of the liquid crystal display panels may be a single display panel or dual display panels stacked in the thickness direction. When the liquid crystal display panel is dual display panels, the display panel in the bottom is used for controlling light, and the display panel in the top is used for display, which can improve contrast of the display device.

The liquid crystal display panel includes an array substrate, a color film substrate disposed opposite the array substrate, and a liquid crystal layer disposed between the array substrate and the color film substrate. The liquid crystal layer includes a plurality of liquid crystal molecules usually in the form of rods that can flow like liquid and have certain crystal characteristics. When the liquid crystal molecules are in an electric field, an arrangement direction thereof changes with change of the electric field. The liquid crystal display panel controls rotation of the liquid crystal molecules of the liquid crystal layer by applying a drive voltage to the array substrate and the color film substrate to refract the light provided by the backlight module to produce an image.

It can be understood that the technical solutions of the backlight module according to embodiments of the present disclosure can be widely used for providing backlight for a variety of double-sided liquid crystal display panels, such as TN (Twisted Nematic) display panels, IPS (In-Plane Switching) display panels, VA (Vertical Alignment) display panels, and MVA (Multi-Domain Vertical Alignment) display panels.

It should be readily understood that the terms "on", "upon" and "above" in the disclosure should be interpreted in a broadest manner such that "on" not only means "directly on something", but also means "above something" and there is an intermediate feature or layer, and "upon" or "above" not only means "upon something" or "above something", but also means "upon something" or "above something" and there is no intermediate feature or layer (i.e., directly on something).

The term "layer" used herein may refer to a material part that includes a region having a certain thickness. The layer may extend over the entire underlying structure or overlying structure or may have an extent smaller than an extent of the underlying or overlying structure. In addition, the layer may be a region of a homogeneous or non-homogeneous continuous structure having a thickness smaller than a thickness of the continuous structure. For embodiment, a layer may be located between top and bottom surfaces of the continuous structure or between any pair of lateral planes at the top and bottom surfaces. The layer may extend laterally, vertically, and/or along a tapered surface.

At last, it should be noted that: the above embodiments are only used to describe the technical solutions of the present disclosure rather than limiting them; although the present disclosure has been described in detail with reference to the foregoing embodiments, a person skilled in the art in the art should understand that: modifications can still be made to the technical solutions described in the foregoing embodiments, or equivalent substitutions can be made to part or all of the technical features: these modifications or substitutions do not cause the spirit of the corresponding technical solutions to depart from the scope of the technical solutions of the embodiments of the present disclosure.

What is claimed is:

1. A backlight module, comprising:
   a light guide plate assembly comprising a first light guide plate and a second light guide plate disposed back to back in a first direction;
   an adjustment member disposed on a side of the light guide plate assembly in a second direction intersecting with the first direction;
   a light emitter connected to the adjustment member; and
   a light intensifier connected to the adjustment member and disposed between the light emitter and the light guide plate assembly in the second direction, wherein the light intensifying film is a structure composed of a prismatic bar and a substrate, wherein
   the adjustment member can drive the light emitter and the light intensifier to move simultaneously in reverse directions in the first direction, so that the light emitter is opposite the light intensifier in the second direction, and light emitted by the light emitter passes through the light intensifier and enters the first light guide plate and the second light guide plate respectively, or, the light emitter and the light intensifier are far away from each other, and light emitted by the light emitter directly enters one of the first light guide plate and the second light guide plate;
   wherein the backlight module comprises at least a first working state, a second working state, and a third working state, and the adjustment member can drive the light intensifier and the light emitter to move to switch between the first working state, the second working state, and the third working state, wherein,
   in the first working state, the light emitter is opposite a connection between the first light guide plate and the second light guide plate, and an orthographic projection of the light source of the light emitter in the second direction is at a center of the light intensifier;
   in the second working state, the orthographic projection of the light source of the light emitter in the second direction is at a center of the first light guide plate, and an orthographic projection of the light intensifier in the second direction is at the second light guide plate; and
   in the third working state, the orthographic projection of the light source of the light emitter in the second direction is at a center of the second light guide plate, and the orthographic projection of the light intensifier in the second direction is at the first light guide plate.

2. The backlight module of claim 1, wherein, the adjustment member comprises:
   a drive motor; and
   a screw assembly comprising a first screw and a second screw parallel to each other, and an axis direction of the first screw is parallel to the first direction, the drive motor connects the first screw and the second screw, the first screw is threadedly connected to the light intensifier, and the second screw is threadedly connected to the light emitter, the drive motor can drive the first screw and the second screw to rotate in reverse directions, so as to drive the light emitter and the light intensifier to move in the reverse directions.

3. The backlight module of claim 2, wherein, the adjustment member further comprises a third screw and gear sets, an axis direction of the third screw is parallel to the second direction, the gear sets are disposed at both ends of the third screw respectively, the gear sets connect the first screw, the second screw, and the third screw, and the drive motor is connected to either of the first screw and the second screw.

4. The backlight module of claim 1, wherein, the first light guide plate and the second light guide plate have the same thickness in the first direction, and a width of the light intensifier in the first direction is not greater than the thickness of the first light guide plate.

5. The backlight module of claim 1, wherein,
   the light emitter comprises a plurality of light sources spaced apart in the third direction, and the first direction, the second direction, and the third direction intersect with each other.

6. The backlight module of claim 5, further comprising: a lens enclosing the light source.

7. The backlight module of claim 1, further comprising: a reflective layer between the first light guide plate and the second light guide plate, wherein
   the reflective layer is coated on at least one of the first light guide plate and the second light guide plate, and the coated reflective layer fixedly connects the first light guide plate and the second light guide plate.

8. A display device, comprising:
   two liquid crystal display panels; and
   a backlight module of claim 1;
   wherein the backlight module is disposed between the two liquid crystal display panels to provide backlight for the two liquid crystal display panels.

* * * * *